United States Patent [19]

Pettijohn et al.

[11] Patent Number: 5,350,807
[45] Date of Patent: Sep. 27, 1994

[54] ETHYLENE POLYMERS

[75] Inventors: Ted M. Pettijohn; Kevin J. Hess, both of Bartlesville, Okla.

[73] Assignee: Phillips Petroleum Company, Bartlesville, Okla.

[21] Appl. No.: 83,149

[22] Filed: Jun. 25, 1993

[51] Int. Cl.$^5$ .................. C08L 27/04; C08L 23/18; C08L 23/16
[52] U.S. Cl. .................. 525/240; 525/320; 525/324; 524/487; 524/490
[58] Field of Search .................. 525/240; 524/487

[56] References Cited

U.S. PATENT DOCUMENTS

| | | | |
|---|---|---|---|
| 3,303,152 | 2/1967 | Harvey | 524/489 |
| 3,665,068 | 5/1972 | Duling et al. | 524/487 |
| 4,127,619 | 11/1978 | Godfrey | 524/487 |
| 4,461,873 | 7/1984 | Bailey et al. | 525/240 |
| 4,471,086 | 9/1984 | Foster | 524/487 |
| 4,509,821 | 4/1985 | Stenger | 524/487 |
| 4,530,914 | 7/1985 | Ewen et al. | 502/113 |
| 4,540,753 | 9/1985 | Cozewith | 526/88 |
| 4,680,330 | 7/1987 | Berrier et al. | 524/481 |
| 4,789,714 | 12/1988 | Cozewith et al. | 526/88 |
| 4,795,767 | 1/1989 | Tarczyk et al. | 524/487 |
| 4,859,749 | 8/1989 | Franke | 526/124 |
| 4,874,820 | 10/1989 | Cozewith et al. | 525/240 |
| 4,880,843 | 11/1989 | Stein | 524/487 |
| 4,933,393 | 6/1990 | Toyota et al. | 525/240 |
| 4,939,217 | 7/1990 | Stricklen | 526/114 |
| 5,019,627 | 5/1991 | Honma et al. | 525/240 |
| 5,102,955 | 4/1992 | Calabro et al. | 525/240 |
| 5,115,067 | 5/1992 | Yagi et al. | 524/487 |

FOREIGN PATENT DOCUMENTS 647527 8/1962 Canada .
54-161657 12/1979 Japan .
203402 12/1986 Japan .

OTHER PUBLICATIONS

Modern Plastics-1963ED-p. 227-1962.

Primary Examiner—Carman J. Seccuro, Jr.
Attorney, Agent, or Firm—Marianne H. Michel

[57] ABSTRACT

A composition is provided, comprising (1) a narrow molecular weight distribution component having an Mw/Mn in the range of about 1.0 to about 2.0 and a weight average molecular weight in the range of about 500 to about 7,500 comprising an ethylene homopolymer; and (2) a broad molecular weight distribution component having an Mw/Mn greater than or equal to about 3.0 and a weight average molecular weight in the range of about 100,000 to about 750,000 comprising and ethylene copolymer; wherein said narrow molecular weight distribution component is present in the polymer composition in an amount of at least about 10 weight percent as based on the total weight of the polymer composition. In another embodiment, the narrow molecular weight distribution component further comprises an ethylene/hexene copolymer.

22 Claims, No Drawings

ETHYLENE POLYMERS

BACKGROUND OF THE INVENTION

The present invention relates to ethylene polymers.

Polymers commonly produced often have narrow molecular weight distribution and are therefore not ideal for preparing articles by conventional polymer process techniques.

For many applications, such as extrusion and molding processes, it is highly desirable to have polymers which have a broad molecular weight distribution. Such polymers evidence excellent processability, i.e., they can be processed at a faster throughput rate with lower energy requirements with reduced melt flow perturbations.

For applications such as blow molding, a high shear response is required. Shear response is defined as the high load melt index divided by the melt index of the polymer.

Another important factor in processing is the amount of smoke produced during the molding operation. Smoke interferes with the process and produces undesirable results.

The preferred polymer properties and the processability of the polymer are often in conflict. Improvements in the processability frequently result in less desirable polymer properties and vice versa. For example, polymers with high density, and high stiffness have low environmental stress crack resistance and low gloss. Polymers which exhibit high environmental stress crack resistance and high gloss have lower density and low stiffness and strength. Thus, most polymers are a compromise, a balance of performance features.

It would therefore be desirable to develop polymer compositions exhibiting desirable processing and performance qualities i.e. high shear response, low smoke during processing, high environmental stress crack resistance, high gloss, and good stiffness.

SUMMARY OF THE INVENTION

An object of this invention is to provide ethylene polymers having desirable processing and performance qualities, i.e. high shear response, high environmental stress crack resistance, high gloss, and high density.

In accordance with this invention, a composition is provided, comprising (1) a narrow molecular weight distribution component having a weight average molecular weight over number average molecular weight (Mw/Mn) in the range of about 1.0 to about 2.0 and a weight average molecular weight of about 500 to about 7,500 comprising an ethylene homopolymer and (2) a broad molecular weight distribution component having an Mw/Mn greater than or equal to about 3.0 and a weight average molecular weight of about 100,000 to about 750,000 comprising an ethylene copolymer, wherein said narrow molecular weight distribution component is present in the polymer composition in an amount of at least about 10 weight percent as based on the total weight of the polymer composition. In another embodiment of the invention, the narrow molecular weight distribution component: further comprises an ethylene copolymer.

DETAILED DESCRIPTION OF THE INVENTION

The narrow molecular weight distribution component of this invention comprises an ethylene homopolymer. The narrow molecular weight distribution component has a weight average molecular weight over number average molecular weight (Mw/Mn) in the range of about 1.0 to about 2.0, more preferably from 1.0 to 1.8.

The weight average molecular weight of the narrow molecular weight distribution component is generally less than about 10,000. Preferably the weight average molecular weight of the narrow molecular weight distribution component is in the range of from about 500 to about 7,500, more preferably from 500 to 5,000, and most preferably from 500 to 3,500.

The narrow molecular weight distribution component is present in the polymer composition in an amount of at least about 10 weight percent as based on the total weight of the polymer composition, generally within the range of from about 10 to about 60 weight percent, preferably from about 10 to about 55 weight percent, and more preferably from 15 to 55 weight percent.

In another embodiment of the present invention, the narrow molecular weight distribution component further comprises an ethylene copolymer.

If ethylene copolymer is included in the narrow molecular weight distribution component, such copolymers comprise ethylene comonomer and a comonomer which is preferably a mono-1-olefin having from 3 to 18 carbon atoms, preferably from 4 to 12 carbon atoms. Examples of suitable mono-1-olefin comonamers include propylene, 1-butene, 1-pentene, 1-hexene, 1-heptene, 4-methyl-1-pentene, 3-methyl-1-pentene, and 3-ethyl-1-hexene and mixtures thereof. The comonomer 1-hexene is most preferred.

When ethylene copolymer is employed in-the narrow molecular weight distribution component, the amount of mono-1-olefin comonomer present can vary over a broad range. Generally the mono-1-olefin comonomer, when employed, is present in an amount sufficient to produce an ethylene copolymer having a density of about 0.950 to about 1.000, more preferably from about 0.955 to about 0.995, and most preferably from 0.960 to 0.990.

The broad molecular weight distribution component of this invention is an ethylene copolymer having a Mw/Mn greater than or equal to about 3.0, preferably in the range of from about 3.0 to about 15, more preferably from 3.0 to 12.

The weight average molecular weight of the broad molecular weight distribution component is generally in the range of from about 100,000 to about 750,000, more preferably from 100,000 to 500,000.

The comonomer employed in preparing the broad molecular weight distribution component are mono-1-olefins described above for the narrow molecular weight distribution component. The mono-1-olefin comonomer in the broad molecular weight distribution component can be the same or different from the mono-1-olefin comonomer employed in preparing the narrow molecular weight distribution component. The preferred comonomer is 1-hexene.

Generally the amount of comonomer present in the broad molecular weight distribution component is the amount sufficient to .produce an ethylene copolymer having a density of about 0.890 to about 0.950, preferably from about 0.900 to about 0.945, and more preferably from 0.910 to 0.945.

The final polymer composition will generally have a Mw/Mn in the range of from about 10 to about 250, preferably from about 15 to about 200, and more preferably from 20 to 150.

The weight average molecular weight of the final polymer composition will generally be in the range of from about 50 000 to about 500,000, preferably from about 75,000 to about 450,000, and more preferably from 100,000 to 400,000.

Generally the melt index (MI), measured according to ASTM D 1238, of the final polymer composition will be in the range of from about 0.01 to about 5.0 g/10 minutes, preferably from about 0.01 to about 3.0, and more preferably from 0.05 to 2.0.

The high load melt index (HLMI), measured according to ASTM D 1238, of the final polymer composition will be in the range of about 5 to about 100 g/10 minutes, preferably about 5 to about 75, and more preferably 10 to 50.

For good processing characteristics in the final polymer composition, the shear response (HLMI/MI), will generally be in the range of from about 15 to about 500, preferably from about 20 to about 300, and more preferably from 25 to 200.

For good strength and rigidity characteristics, the density of the final polymer composition, measured according to ASTM D 1505, will generally be in the range of from about 0.940 to about 0.970 g/cc., preferably from about 0.944 to about 0.970, and more preferably from 0.944 to 0.965.

The compositions of the present invention can be prepared by any means known in the art such as extruder blending, multiple reactors in series or in parallel, multiple catalysts in the same reactor, or a single, multi-site catalyst.

For example, the polymers can be produced by catalysts capable of producing bimodal molecular weight distribution polymers. Examples of such catalysts include those disclosed in Ser. No. 07/906,989 filed Jun. 30, 1992, U.S. Pat. No. 5,258,344; 07/810,734 filed Dec. 18, 1991, U.S. Pat. No. 5,258,343 and U.S. Pat. No. 5,182,244 issued Jan. 26, 1993 which are incorporated herein by reference.

In the alternative, the narrow molecular weight distribution component and broad molecular weight distribution component can be prepared separately and then blended.

Ethylene polymers having a narrow molecular weight distribution are commercially available and can be produced with catalysts known in the art, such as for example titanium, zirconium and/or vanadium-containing catalysts. Titanium-containing catalysts are preferred. Such catalysts, as well as polymerization processes to make such polymers, are described in more detail, but not limited to, those disclosed in U.S. Pat. No. 4,326,988; U.S. Pat. No. 4,394,291; and U.S. Pat. No. 4,562,168 which are incorporated herein by reference.

Ethylene polymers exhibiting broad molecular weight distribution characteristics are also commercially available and can be prepared with catalysts known in the art, for example, by chromium catalyst systems. Typically the chromium catalyst systems comprise chromium, at least a portion of which is in the hexavalent state, supported on an inorganic oxide, and optionally a metal alkyl cocatalyst. Exemplary chromium catalyst systems include, but are not limited to those disclosed in U.S. Pat. Nos. 3,887,494; 3,900,457; 4,053,436; 4,151,122; 4,294,724; 4,392,990; and 4,405,501, incorporated herein by reference.

When prepared separately, the narrow molecular weight distribution component and broad molecular weight distribution component can be blended by any method known in the art. For example, the components can be blended by dry blending the components in fluff form. The components can also be melt blended in a batch process such as with a Banbury Mixer or in a continuous process such as with a typical pelletizing extruder. The components can be dry blended prior to the melt blending. The components can also be blended by solution blending methods.

The blending conditions depend upon the blending technique and polymer employed. If an initial dry blending of the polymer is employed, the dry blending conditions may include temperatures from room temperature up to just under the melting temperature of the polymer, and blending times in the range of a few seconds to hours. If solution blending methods are employed, the blending temperature will generally be 25° C. to 50° C. above the cloud point of the solution involved.

During melt blending, the temperature at which the polymers are combined in the blender will generally be in the range between the highest melting point of the polymers employed and up to about 150° C. above such melting point, preferably between such melting point and up to 100° C. above such melting point.

The time required for the melt blending can vary broadly and depends on the method of blending employed. The time required is the time sufficient to thoroughly mix the components. Generally, the individual polymers are blended for a time of about 10 seconds to about 30 minutes.

The polymers of the invention are useful for the production of polyolefin film, particularly by known tubing techniques, for blow-molding (e.g. to produce bottles), for pipe production, wire coating, injection molding, and rotational molding. Due to the combination of high shear ratio and high ESCR ratings, even under rigorous conditions, the polymer compositions prepared according to the invention, are especially useful in blow molding techniques.

The following examples will serve to show the present invention in detail by way of illustration and not by way of limitation.

EXAMPLES

The following examples demonstrate the processing and polymer characteristics exhibited by ethylene polymers containing a narrow molecular weight distribution component and a broad molecular weight distribution component.

EXAMPLE I

Example I demonstrates the effective processing and density characteristics of the inventive polymer compositions.

The polymer compositions in Example I were produced employing a multi-site catalyst capable of producing a bimodal molecular weight distribution polymer. The catalyst was prepared by combining 1.005 g $NdCl_3$ and 2.946 g 1,2-octanediol, followed by 20 mL toluene in a large pressure tube. A purple solution was formed while stirring. 5 mL $TiCl_4$ was added slowly which produced an orange slurry. The thus formed slurry was heated at 80°–85° C. for about 1.5 hours. The tube was vented and 30 mL cyclohexane were added. The slurry was stirred at room temperature for 1 hour. The solids were centrifuged and washed three times with cyclohexane. 50 mL cyclohexane was added to the washed solids. Solvent was removed in vacuum from a 5 mL, aliquot which gave 0.1756 g or 35 mg/mL catalyst solution.

The polymerization reactions were performed in a one gallon, stirred autocalve. Prior to the reactions, the autoclave was washed thoroughly with dry cyclohexane and purged with nitrogen. Cocatalyst, 4–25 mL, diethylaluminum chloride (1M DEAC), followed by 3–15 mg catalyst suspended in cyclohexane, were charged through a small port under a counter flow of ethylene. The reactor was sealed and 2 liters isobutane and 17–67 $\Delta P$ $H_2$, (pressure decrease measured in 2.25 L cylinder) were charged. The pressure was raised to 550 psig with 260–310 $\Delta P$ ethylene. 67–94 g 1-hexene were added to the reactor and the reactor temperature was raised to 90° C. and held for 1 hour. At the end of the reaction, solvent, and ethylene were rapidly vented and the solid polymer was collected and dried. Characteristics of typical final compositions are represented in Tables 1 and 2. Table 3 defines the parameters of the individual components.

Terms used in the tables are defined as follows:

HLMI is high load melt index, in g/10 minutes run according to ASTM D 1238.

SR is shear response and is the ratio of high load melt index to melt index.

Mw is the weight average molecular weight.

Mw/Mn is the ratio of weight average molecular weight to number average molecular weight.

NMW is the weight percent of the narrow molecular weight distribution component based on the total weight of the polymer composition. Density is reported in g/cc determined according to ASTM D 1505.

ESCR is environmental stress cracking resistance in hours, determined according to ASTM D 1693-70, conditions B or C as indicated.

TABLE 1

| Run | HLMI g/10 min | SR | Mw/ 1000 | Mw/Mn | NMW wt % | Density g/cc | ESCR-B hrs |
|---|---|---|---|---|---|---|---|
| 101 | 24.04 | 30 | 148 | 11.2 | 9 | 0.9521 | 470 |
| 102 | 25.13 | 38 | 144 | 19.1 | 13 | 0.9517 | >1000 |
| 103 | 27.67 | 33 | 139 | 23.9 | 17 | 0.9539 | >1000 |
| 104 | 21.96 | 43 | 159 | 33.7 | 22 | 0.9517 | >1000 |
| 105 | 23.86 | 47 | 156 | 40.0 | 23 | 0.9501 | >1000 |
| 106 | 22.94 | 40 | 158 | 38.4 | 28 | 0.9558 | >1000 |
| 107 | 28.35 | 44 | 159 | 31.0 | 28 | 0.9528 | >1000 |
| 108 | 27.88 | 45 | 140 | 31.1 | 29 | 0.9538 | >1000 |
| 109 | 22.81 | 76 | 187 | 31.5 | 36 | 0.9581 | >1000 |
| 110 | 39.81 | 95 | 107 | 29.5 | 47 | 0.9542 | >1000 |

TABLE 2

| Run | HLMI g/10 min | SR | Mw/ 1000 | Mw/Mn | NMW wt % | Density g/cc | ESCR-C hrs |
|---|---|---|---|---|---|---|---|
| 201 | 9.40 | 28 | 186 | 20.5 | 9 | 0.9498 | 34 |
| 202 | 11.08 | 48 | 193 | 21.9 | 12 | 0.9498 | >1000 |
| 203 | 9.43 | 39 | 204 | 37.3 | 18 | 0.9501 | >1000 |
| 204 | 6.85 | 40 | 213 | 42.4 | 19 | 0.9484 | >1000 |
| 205 | 13.23 | 37 | 184 | 22.6 | 20 | 0.9511 | >1000 |
| 206 | 6.70 | 45 | 232 | 53.3 | 21 | 0.9482 | >1000 |
| 207 | 7.53 | 44 | 224 | 47.4 | 23 | 0.9480 | >1000 |
| 208 | 7.24 | 45 | 210 | 45.8 | 28 | 0.9542 | >1000 |

TABLE 3

| | Narrow MWD | | Broad MWD | | Final Composition | |
|---|---|---|---|---|---|---|
| Run | Mw/1000 | Mw/Mn | Mw/ 1000 | Mw/Mn | Mw/100 | Mw/Mn |
| 301 | 1.01 | 1.27 | 172 | 4.74 | 121 | 47.5 |
| 302 | 1.10 | 1.31 | 439 | 6.40 | 334 | 98.3 |
| 303 | 1.22 | 1.24 | 278 | 5.35 | 216 | 52.4 |

Tables 1 and 2 demonstrate that polymer compositions containing a narrow molecular weight distribution component and a broad molecular weight distribution component exhibit the combination of high density, high SR, and good ESCR ratings. Tables 1 and 2 also demonstrate that for best results, the narrow molecular weight distribution component is present in the polymer composition in an amount of at least about 10 weight percent. Table 3 describes the characteristics of typical components.

EXAMPLE II

Ethylene polymer blends were prepared to evaluate various processing and performance qualities.

The blends were prepared employing 20, 30, and 40 weight percent narrow molecular weight distribution component. The narrow molecular weight distribution component was commercially available as Polywax 3000 PE, from Petrolire Corp., Tulsa, Okla. The polymer was an ethylene homopolymer having a weight average molecular weight of 3,000, a Mw/Mn of 1.1, and density of 0.98. The polymer was in chunk form and was milled to a form similar to polymer fluff.

The broad molecular weight distribution component was an ethylene/hexene copolymer and exhibited an Mw/Mn of 5–7, 7.63 HLMI and 0.9312 density. The copolymer was prepared in a continuous particle form process by contacting a titanium/magnesium catalyst with the monomers, employing a liquid full loop reactor, isobutane as the diluent, and hydrogen to regulate the molecular weight of the product. The reactor was operated to have a residence time of 1.25 hrs. The reactor temperature was varied over the range of 80 to 90° C., and the pressure was 4 MPa (580 psi). At steady state conditions, the isobutane feed rate was 46 L/hr, the ethylene feed rate was about 30 lbs/hr, and the hexene feed rate was varied to control the density of the product polymer.

The blends were extruder blended in a Werner and Pfleiderer ZSK30 extruder. The blends containing 20–40 weight percent narrow molecular weight distribution component exhibited ESCR rating of greater than 1000 hours under both the ESCR A method and the modified B method. The modified B method employs 10% Igepal rather than 100% Igepal. The modified B conditions are more severe.

A MIE model RAM-1 aerosol monitor from Monitoring Instruments for the Environment, Bedford, Mass., was used to measure smoke generated from extrudate at the orifice of a Tinlure Olsen melt indexer. The melt indexer was heated to 217° C. and loaded with 7 grams of polymer fluff or pellets. The smoke sample was drawn into the monitor unit by a metering pump through a 5/16" I.D.×32" neoprene hose connected to a Pyrex chimney positioned below the melt indexer. The monitor measured particle size in the range of 0.1 to 20 microns and concentrations in the range of 0.01 to 2000 mg/m³. Smoke measurements were averaged over a period of 1 1/2 minutes and reported in mg/m³ based on an internal Arizona road dust standard. Various polymer and processing characteristics are represented in Table 4. Flexural modulus was measured according to ASTM D 790.

TABLE 4

| NMW % | HLMI g/10 min | SR | Density g/cc | Flexural Modulus psi | Smoke mg/m$^3$ |
|---|---|---|---|---|---|
| 40 | 97.43 | 64 | 0.9546 | 221,000 | 10.5 |
| 30 | 48.46 | 58 | 0.9492 | 181,000 | 6.8 |
| 20 | 21.99 | 43 | 0.9444 | 156,000 | 5.5 |

Table 4 demonstrates that the amount of smoke produced during processing is greatly reduced when employing a blend comprising a narrow molecular weight distribution component and broad molecular weight distribution component. Such blends also exhibit desirable gloss characteristics.

That which is claimed is:

1. A polymer composition having a density in the range of from about 0.940 to about 0.790 g/cc measured according to ASTMD 1505 comprising:
    (a) a narrow molecular weight distribution component having a weight average molecular weight over number average molecular weight (Mw/Mn) in the range of about 1.0 to about 2.0 comprising an ethylene homopolymer; and
    (b) a broad molecular weight distribution component having a Mw/Mn greater than or equal to about 3.0 comprising an ethylene copolymer comprising ethylene and a mono-1-olefin comonomer containing 3 to 18 carbon atoms;
    wherein said narrow molecular weight distribution component is present in the polymer composition in an amount of at least about 10 weight percent as based on the total weight of the polymer composition;
    wherein said narrow molecular weight distribution component has a weight average molecular weight of about 500 to about 7,500; and
    wherein said broad molecular weight distribution component has a weight average molecular weight of about 100,000 to about 750,000.

2. A composition according to claim 1, wherein said narrow molecular weight distribution component has an Mw/Mn of 1.0 to 1.8.

3. A composition according to claim 1, wherein said narrow molecular weight distribution component has a weight average molecular weight of about 500 to about 5,000.

4. A composition according to claim 3, wherein said narrow molecular weight distribution component has a weight average molecular weight of about 500 to about 3,500.

5. A composition according to claim 1, wherein said narrow molecular weight distribution component is present in the polymer composition in an amount in the range of from about 10 to about 60 weight percent as based on the total weight of the polymer composition.

6. A composition according to claim 5, wherein said narrow molecular weight distribution component is present in the polymer composition in an amount in the range of about 10 to about 55 weight percent as based on the total weight of the polymer composition.

7. A composition according to claim 6, wherein said narrow molecular weight distribution component is present in the polymer composition in an amount in the range of from 15 to 55 weight percent as based on the total weight of the polymer composition.

8. A composition according to claim 1, wherein said broad molecular weight distribution component has an Mw/Mn of about 3.0 to about 15.

9. A composition according to claim 8, wherein said broad molecular weight distribution component has an Mw/Mn of 3.0 to 12.

10. A composition according to claim 1, wherein said broad molecular weight distribution component has a weight average molecular weight of 100,000 to 500,000.

11. A composition according to claim 1, wherein said mono-1-olefin comonomer contains from 4 to 12 carbon atoms.

12. A composition according to claim 11, wherein said mono-1-olefin comonomer is 1-hexene.

13. A composition according to claim 1, wherein said narrow molecular weight distribution component further comprises an ethylene copolymer.

14. A composition according to claim 13, wherein said copolymer said narrow molecular weight distribution component comprises ethylene comonomer and mono-1-olefin comonomer containing from 3 to 18 carbon atoms.

15. A composition according to claim 14, wherein said mono-1-olefin comonomer contains from 4 to 12 carbon atoms.

16. A composition according to claim 15, wherein said comonomer is 1-hexene.

17. A polymer composition having a density in the range of from about 0.940 to about 0.970 g/cc measured according to ASTMD 1505 comprising:
    (a) a narrow molecular weight distribution component having an Mw/Mn of 1.0 to 1.8 comprising an ethylene homopolymer; and
    (b) a broad molecular weight distribution component having an Mw/Mn in the range of 3.0 to 12 comprising an ethylene/hexene copolymer;
    wherein said narrow molecular weight distribution component has a weight average molecular weight of 500 to 3,500;
    wherein said broad molecular weight distribution component has a weight average molecular weight of 100,000 to 500,000; and
    wherein said narrow molecular weight distribution component is present in the polymer composition in an amount in the range of from 15 to 55 weight percent is based on the total weight of the polymer composition.

18. A polymer composition according to claim 17 wherein said narrow molecular weight distribution component further comprises an ethylene/hexene copolymer.

19. A polymer composition according to claim 17 having a high load melt index in the range of about 5 to about 100 g/10 min. measured according to ASTM D 1238.

20. A polymer composition according to claim 17 having a shear response in the range of about 15 to about 500.

21. A polymer composition having a density in the range of from about 0.940 to about 0.970 g/cc measured according to ASTMD 1505 consisting essentially of:
    (a) a narrow molecular weight distribution component having a weight average molecular weight over number average molecular weight (Mw/Mn) in the range of about 1.0 to about 2.0 consisting essentially of an ethylene homopolymer, and (b) a broad molecular weight distribution component having a Mw/Mn greater than or equal to about 3.0 consisting essentially of an copolymer comprising ethylene and a mono-1-olefin comonomer containing 3 to 18 carbon atoms ethylene;

wherein said narrow molecular weight distribution component is present in the polymer composition in an amount of at least about 10 weight percent as based on the total weight of the polymer composition;

wherein said narrow molecular weight distribution component has a weight average molecular weight of about 500 to about 7,500; and wherein said broad molecular weight distribution component has a weight average molecular weight of about 100,000 to about 750,000.

22. A polymer composition having a density in the range of from about 0.940 to about 0.970 g/cc measured according to ASTMD 1505 consisting essentially of:

(a) a narrow molecular weight distribution component having an Mw/Mn of 1.0 to 1.8 consisting essentially of an ethylene homopolymer and (b) a broad molecular weight distribution component having an Mw/Mn in the range of 3.0 to 12 consisting essentially of an ethylene copolymer comprising ethylene and a mono-1-olefin comonomer containing 3 to 18 carbon atoms;

wherein said narrow molecular weight distribution component has a weight average molecular weight of 500 to 3,500;

wherein said broad molecular weight distribution component has a weight average molecular weight of 100,000 to 500,000; and wherein said narrow molecular weight distribution component is present in the polymer composition in an amount in the range of from 15 to 55 weight percent as based on the total weight of the polymer composition.

* * * * *

UNITED STATES PATENT AND TRADEMARK OFFICE
CERTIFICATE OF CORRECTION

PATENT NO.   : 5,350,807

DATED        : September 27, 1994

INVENTOR(S)  : Ted M. Pettijohn and Kevin J. Hess

It is certified that error appears in the above-identified patent and that said Letters Patent is hereby corrected as shown below:

Claim 1, column 7, line 21, delete "0.790" and insert --- 0.970 --- therefor.

Claim 17, column 8, line 48, delete "is" and insert --- as --- therefor.

Signed and Sealed this

Seventeenth Day of January, 1995

Attest:

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO. : 5,350,807

DATED : September 27, 1994

INVENTOR(S) : Ted M. Pettijohn and Kevin J. Hess

It is certified that error appears in the above-identified patent and that said Letters Patent is hereby corrected as shown below:

Column 9, line 3, insert --- ethylene --- before copolymer.

Column 9, line 5, delete "ethylene".

Signed and Sealed this

Seventh Day of March, 1995

*Attest:*

BRUCE LEHMAN

*Attesting Officer*      *Commissioner of Patents and Trademarks*